US012701444B2

(12) United States Patent
Swartz et al.

(10) Patent No.: US 12,701,444 B2
(45) Date of Patent: Aug. 4, 2026

(54) SURVEY AND OPTIMIZER SYSTEM FOR LARGE PUBLIC VENUE ACCESS POINT NETWORKS WITH STEERABLE ANTENNA BEAMS

(71) Applicant: Cisco Technology, Inc., San Jose, CA (US)

(72) Inventors: John Matthew Swartz, Lithia, FL (US); Jerome Henry, Pittsboro, NC (US); Robert Edgar Barton, Richmond (CA); Matthew Aaron Silverman, Shaker Heights, OH (US); Fred Jay Anderson, Lakeville, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 604 days.

(21) Appl. No.: 17/990,790

(22) Filed: Nov. 21, 2022

(65) Prior Publication Data

US 2024/0172012 A1 May 23, 2024

(51) Int. Cl.
*H04W 24/08* (2009.01)
*H04W 24/02* (2009.01)

(52) U.S. Cl.
CPC ........... *H04W 24/08* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 9,641,307 | B2 * | 5/2017 | Hintersteiner | ........ H04W 24/08 |
| 2013/0003590 | A1 | 1/2013 | Gage et al. | |
| 2014/0003365 | A1 * | 1/2014 | Carey | ................. H04W 72/046 |
| | | | | 370/329 |
| 2016/0262163 | A1 | 9/2016 | Gonzalez Garrido et al. | |

(Continued)

OTHER PUBLICATIONS

Extricom, "Extricom LV-2000—The Extricom Large Public Venue Solution," https://www.winncom.com/pdf/Extricom_LV_2000/Extricom_LV-2000.pdf, Jun. 2013, 4 pages.

(Continued)

*Primary Examiner* — Ayaz R Sheikh
*Assistant Examiner* — Christopher R Davis
(74) *Attorney, Agent, or Firm* — Edell, Shapiro & Finnan, LLC

(57) ABSTRACT

Presented herein are techniques to optimize wireless local area network access point beam settings. A method includes, during a survey period, causing a first access point and a second access point in a wireless local area network, to simultaneously transmit survey transmissions according to a predetermined sequence of transmission states, receiving, from a survey station that received the survey transmissions during the survey period, telemetry associated with the survey transmissions, the telemetry including a location of the survey station when the survey station received the survey transmissions, and after the survey period, controlling, based on the telemetry associated with the survey transmissions, the first access point to operate according to a first transmission state from among the transmission states and the second access point to operate according to a second transmission state from among the transmission states.

20 Claims, 7 Drawing Sheets

| |
|---|
| TIMESTAMP |
| LOCATION |
| AP ID |
| CHANNEL |
| RSSI |
| BEAM SHAPE, DIRECTION INDICATOR |
| TRANSMIT POWER INDICATOR |

DETECTED/DETERMINED BY SURVEY CLIENT 320

RECEIVED FROM AP 115

(56) References Cited

U.S. PATENT DOCUMENTS

| | | | | |
|---|---|---|---|---|
| 2017/0026293 | A1* | 1/2017 | Desclos | .................. H04B 7/10 |
| 2017/0338883 | A1* | 11/2017 | Clarke | ................. H04W 24/02 |
| 2017/0353870 | A1 | 12/2017 | Rybakowski et al. | |
| 2018/0007703 | A1* | 1/2018 | Pajona | ................. H04W 72/54 |
| 2021/0135354 | A1 | 5/2021 | Sanford et al. | |
| 2021/0289493 | A1* | 9/2021 | Choi et al. | ......... H04W 72/542 |
| 2021/0385678 | A1* | 12/2021 | Akkarakaran | ........ H04L 5/0023 |
| 2022/0225115 | A1 | 7/2022 | Kalavakuru et al. | |

OTHER PUBLICATIONS

Ibwave, "Mobile Survey," Datasheet, https://www.ibwave.com/storage/app/media/pdf/datasheets/iBwave-Mobile-Survey-Public-Safety-datasheet.pdf?v=18, Jul. 2022, 6 pages.
Ekahau, "Ekahau AI Pro," Datasheet, https://www.ekahau.com/wp-content/uploads/2022/05/EKH_AlPro_051922.pdf, Jul. 2022, 3 pages.

* cited by examiner

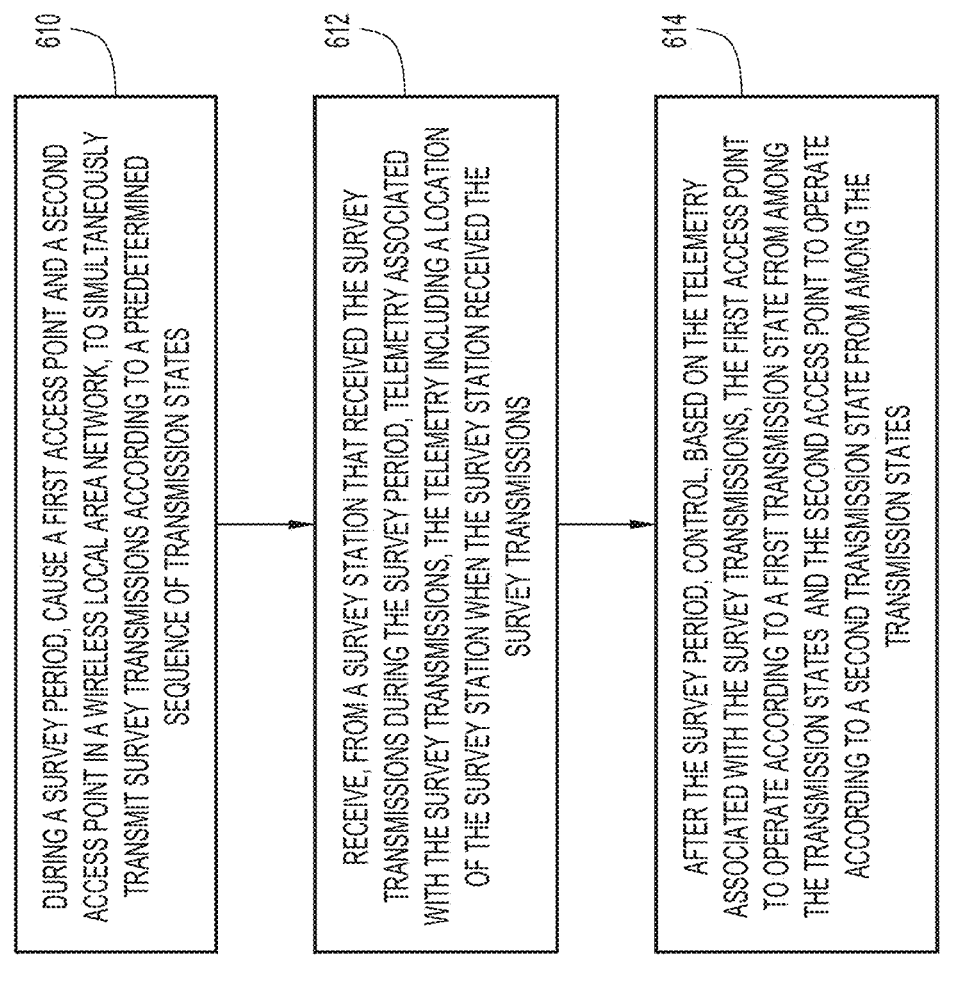

610

DURING A SURVEY PERIOD, CAUSE A FIRST ACCESS POINT AND A SECOND ACCESS POINT IN A WIRELESS LOCAL AREA NETWORK, TO SIMULTANEOUSLY TRANSMIT SURVEY TRANSMISSIONS ACCORDING TO A PREDETERMINED SEQUENCE OF TRANSMISSION STATES

612

RECEIVE, FROM A SURVEY STATION THAT RECEIVED THE SURVEY TRANSMISSIONS DURING THE SURVEY PERIOD, TELEMETRY ASSOCIATED WITH THE SURVEY TRANSMISSIONS, THE TELEMETRY INCLUDING A LOCATION OF THE SURVEY STATION WHEN THE SURVEY STATION RECEIVED THE SURVEY TRANSMISSIONS

614

AFTER THE SURVEY PERIOD, CONTROL, BASED ON THE TELEMETRY ASSOCIATED WITH THE SURVEY TRANSMISSIONS, THE FIRST ACCESS POINT TO OPERATE ACCORDING TO A FIRST TRANSMISSION STATE FROM AMONG THE TRANSMISSION STATES AND THE SECOND ACCESS POINT TO OPERATE ACCORDING TO A SECOND TRANSMISSION STATE FROM AMONG THE TRANSMISSION STATES

FIG.6

CONTROL LOGIC 720

STORAGE 706

I/O 714

MEMORY ELEMENT(s) 704

I/O 710

NETWORK PROCESSOR UNIT(s) 710

708

I/O 712

PROCESSOR(s) 702

700

SURVEY AND OPTIMIZER SYSTEM FOR LARGE PUBLIC VENUE ACCESS POINT NETWORKS WITH STEERABLE ANTENNA BEAMS

TECHNICAL FIELD

The present disclosure relates to wireless local area network management, and more particularly to methodologies to optimize wireless coverage in venues having multiple access points with potentially overlapping coverage areas.

BACKGROUND

In computer networking, a wireless access point (AP) is a networking hardware device that allows a wireless local area network (WLAN) (e.g., Wi-Fi) compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly referred to as a "WLAN controller."

In Large Public Venues (LPVs) such as, e.g., stadiums, concert halls, convention centers, etc., antennas (i.e., APs) are usually deployed at fixed locations, e.g., near catwalks, scoreboards, etc. to achieve the best overall coverage for client (mobile) devices. Sometimes, placement locations for the antennas are based on predictive methods. However, such predictive methods (which are often based on propagation simulations) are only as good as the representation of the environment. In many cases, wireless infrastructure installers are not given venue 3D models with accurate composition data and details of the superstructure (where APs may be located) or other fixed or moveable features within the venue (platforms, moveable scoreboards, seating, etc.). Moreover, the mounting locations of the APs may not be determined until an installer is actually presented with all the physical constraints of each mounting location—conduits, HVAC, audio/video equipment, and other blockages, which may be undocumented.

BRIEF DESCRIPTION OF THE DRAWINGS

FIG. 6 shows a flowchart depicting a series of operations executed by antenna beam optimization logic, according to an example embodiment.

DETAILED DESCRIPTION

Overview

Figure 1:
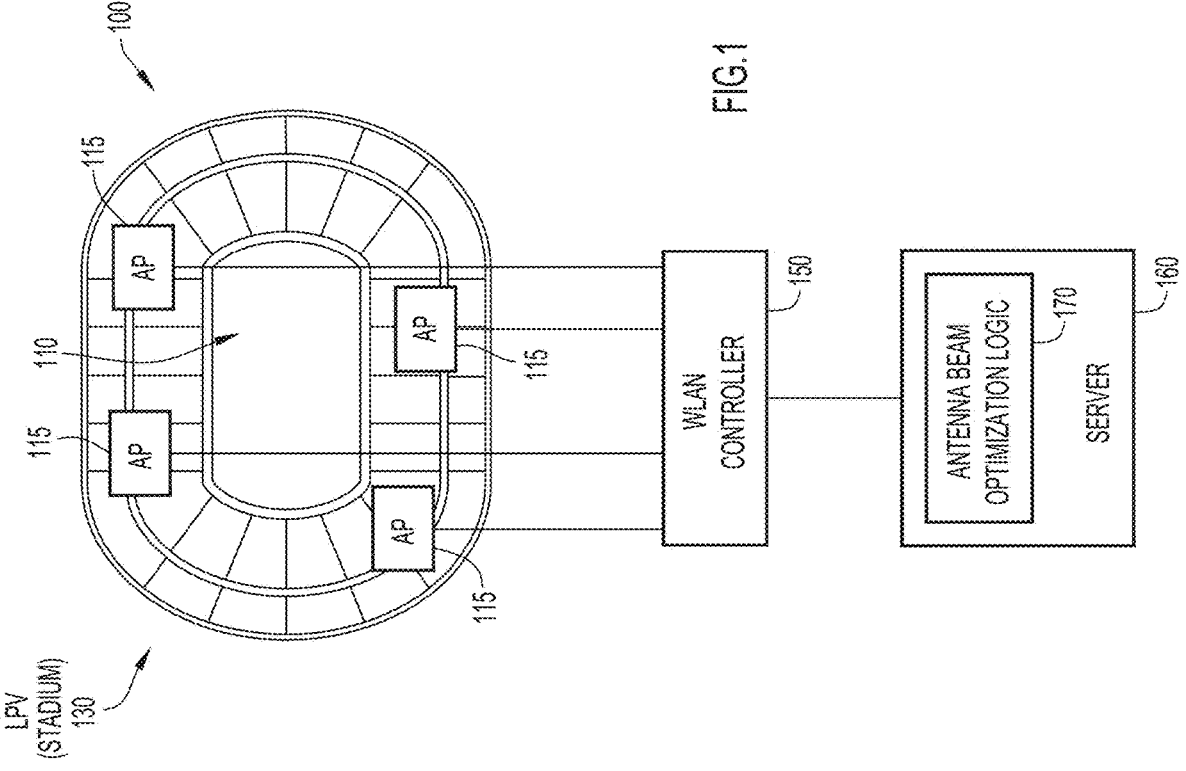
FIG. 1 shows components of a system including a wireless local area network and antenna beam optimization logic, according to an example embodiment.

Presented herein are techniques to optimize wireless local area network access point beam settings. A method includes, during a survey period, causing a first access point and a second access point in a wireless local area network, to simultaneously transmit survey transmissions according to a predetermined sequence of transmission states, receiving, from a survey station that received the survey transmissions during the survey period, telemetry associated with the survey transmissions, the telemetry including a location of the survey station when the survey station received the survey transmissions, and after the survey period, controlling, based on the telemetry associated with the survey transmissions, the first access point to operate according to a first transmission state from among the transmission states and the second access point to operate according to a second transmission state from among the transmission states.

In another embodiment, a device is provided. The device includes an interface configured to enable network communications, a memory, and one or more processors coupled to the interface and the memory, and configured to: during a survey period, cause a first access point and a second access point in a wireless local area network, to simultaneously transmit survey transmissions according to a predetermined sequence of transmission states, receive, from a survey station that received the survey transmissions during the survey period, telemetry associated with the survey transmissions, the telemetry including a location of the survey station when the survey station received the survey transmissions, and after the survey period, control, based on the telemetry associated with the survey transmissions, the first access point to operate according to a first transmission state from among the transmission states and the second access point to operate according to a second transmission state from among the transmission states.

Example Embodiments

In large-scale LPV deployments, particularly stadiums and outdoor concert venues, steerable beam multi-radio access points (APs) are often used to create multiple cell coverage zones from their respective mounting points. This multiplicity of APs, their beams, the directions they may point, the different Wi-Fi channels available, and the available RF output powers are all important parameters to be managed in order to set up a wireless network for optimum capacity and coverage across the venue. This is a very large number of variables and is a challenging manual optimization problem for most network operators.

To address this optimization problem, the embodiments described herein leverage the capabilities of steerable beam APs by having the APs, during a survey period, relatively quickly (e.g., within 1-5 seconds) cycle through different combinations of beam shapes, directions, channels, and RF transmission output powers, and transmit, at the same time, respective AP identifiers, and possibly information indicative of beam shape, direction, and transmit power. While cycling through these combinations, a mobile survey client circulates within the venue and, e.g., every few seconds, records its location (coordinates), received signal strength (RSSI) values, and at least AP identifier information from the transmitting APs. The recorded information is then processed by an optimization routine to identify an optimized beam configuration for each AP that provides coverage throughout the LPV. That is, each AP is then controlled to operate in accordance with one of the transmission states that it cycled through during the survey period.

Reference is now made to the drawings, beginning with FIG. 1, which shows components of a system 100 including a wireless local area network and antenna beam optimization logic 170, according to an example embodiment. More specifically, system 100 includes a wireless local area network or WLAN 110 that is comprised of steerable beam access points (APs) 115 deployed throughout a large public venue or LPV 130, such as a stadium or concert hall. A WLAN controller 150 is in communication with each AP 115 to control operation of each AP 115, including its transmission configuration or transmission state. In this disclosure, transmission state includes at least one of, among other possible parameters, an antenna beam shape, direction, transmit power, and transmit channel. As further shown in FIG. 1, WLAN controller 150 is in communication with a server 160 that hosts antenna beam optimization logic 170, the function of which will be described more fully below. Server 160 may be a computing device 700, like that described in connection with FIG. 7. In an alternative implementation, WLAN controller 150 could host antenna beam optimization logic 170.

Figure 2B:
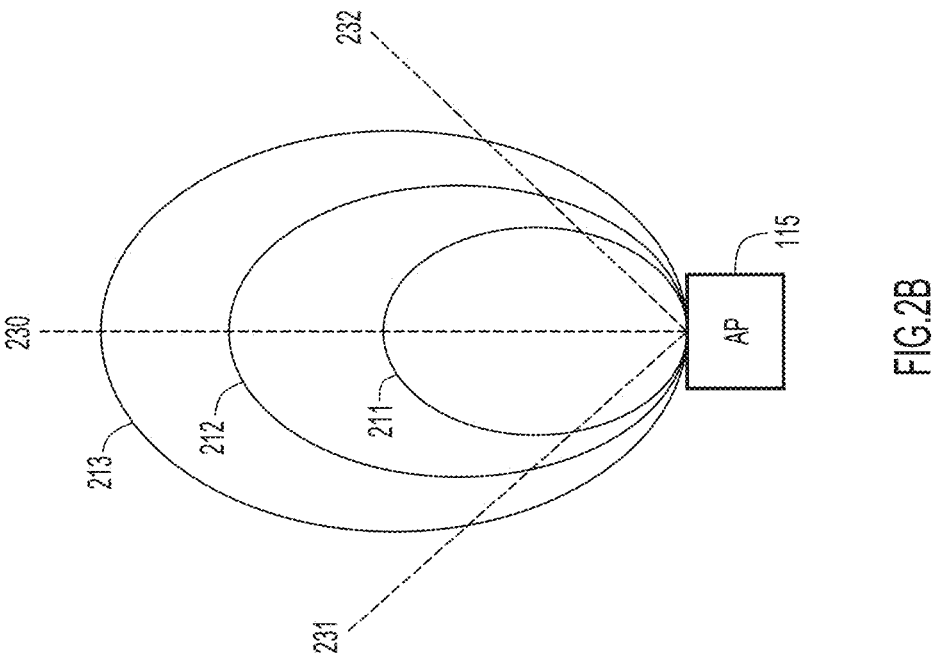
FIGS. 2A and 2B show antenna beam configuration possibilities for an access point, according to an example embodiment.
Figure 2A:
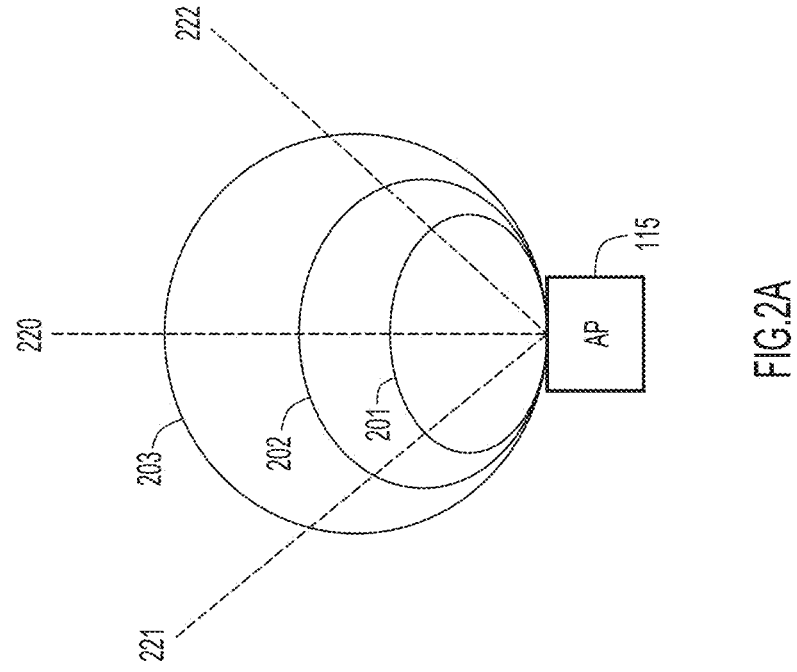

FIGS. 2A and 2B show possible access point antenna beam configurations, according to an example embodiment. FIG. 2A shows a more circular beam pattern for a beam at transmit powers 201, 202, or 203. Axis lines 220, 221, and 222 represent possible pointing directions for the circular beam pattern. That is, AP 115 may be configured to control not only beam shape (in this case relatively circular), but also the direction in which the beam is primarily pointed. Direction may be controlled up to +45 to −45 degrees or more, for example, off of axis line 220, as illustrated in FIG. 2A.

Similarly, FIG. 2B shows a narrower beam pattern for a beam at transmit powers 211, 212, or 213. Axis lines 230, 231, and 232 represent possible pointing directions for the narrow beam pattern. That is, AP 115 may be configured to control not only beam shape (in this case relatively narrow), but also the direction in which the narrow beam is primarily pointed. Direction may be controlled up to +45 to −45 degrees or more, for example, off of axis line 230, as illustrated in FIG. 2A.

Figure 3:
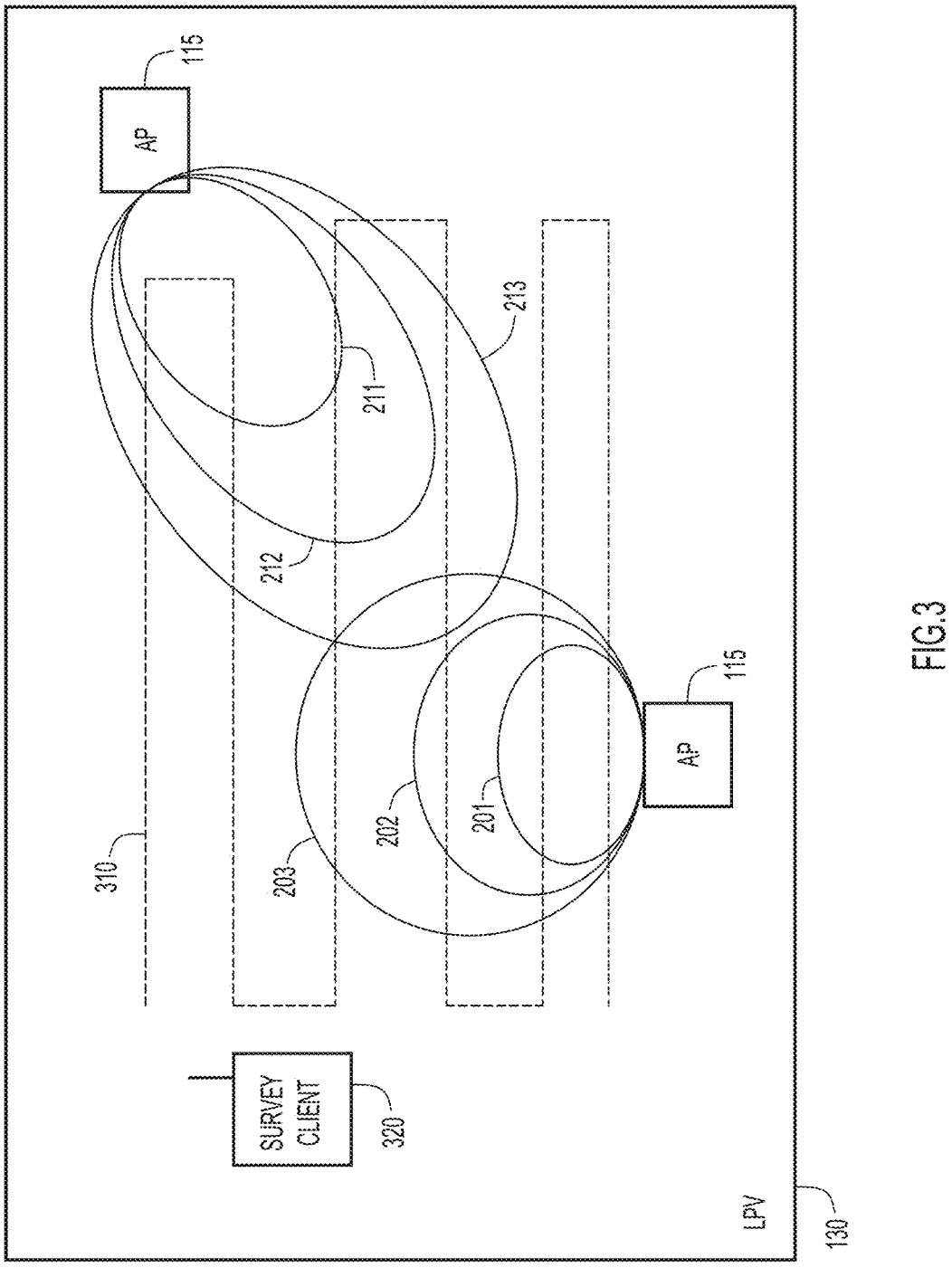
FIG. 3 shows how access point coverage areas can overlap with one another and further shows a path via which a survey client might take to gather telemetry, according to an example embodiment.

FIG. 3 shows how access point coverage areas can overlap with one another, and further shows a path 310 via a which a survey client 320 might take to gather telemetry, according to an example embodiment. That is, when different APs 115 are deployed together in LPV 130, their respective beams can be controlled such that there is (perhaps minimal) overlap of coverage areas, by controlling, e.g., channel, beam shape, direction, and transmission power. In accordance with an embodiment, a survey client 320 (e.g., a wireless mobile device) may be carried along a path 310 while, during a survey period, each AP 115 cycles through a plurality of transmission states. Survey client 320 records RSSI, and AP identifier information among other possible parameters, and then, during or after the survey period, provides the logged information to antenna beam optimization logic 170, which then selects an optimum transmission state, from among the plurality of transmission states, for each AP in the WLAN 110.

Thus, as those skilled in the art will come to appreciate, the embodiments described herein provide a survey and radio configuration management system that enables a selfoptimization mode of a network of LPV multi-beam APs, survey/sensor devices, and a server application (e.g., antenna beam optimization logic 170). In one implementation, the approach utilizes a single in-situ survey session managed by WLAN controller 150, and a survey application (to gather/record telemetry) executing on survey client 320. A network configuration optimizer to optimize beam shape, direction, power, and channel among APs 115, is executed by antenna beam optimization logic 170 based on the telemetry, data, information, etc. collected by survey client 320.

In operation, WLAN 110 enters a setup mode, triggered, e.g., by antenna beam optimization logic 170 or WLAN controller 150, in which APs 115 and their individual radios are set to, simultaneously, transmit over designated channels within their capabilities (channels/power levels, beam shapes, i.e., different transmission states). In one embodiment, a mobile (walkabout) survey client 320 traverses the environment to be surveyed along a random or predetermined path 310, and a series of telemetry parameters are collected based on client measurements (e.g., RSSI, AP identifier, etc.). Survey client 320 may be equipped with an automated position tracking means (e.g., GPS), or the position of survey client 320 may be entered manually on a venue map (as is customary with some site survey tools). In another embodiment, active sensors (e.g., an Aironet Active Sensor, available from Cisco Systems, Inc, San Jose, CA) may be placed in the environment in strategic, deterministic, locations throughout the venue. Of course, this latter approach could result in less accurate/thorough telemetry, depending on the number of sensors deployed.

In accordance with an embodiment, each AP 115 cycles rapidly through its beam settings (transmission states) continuously throughout the survey period, presenting measurement opportunities at each survey position. This cycling is happening at a high enough rate (e.g., about 1-5 seconds) such that survey client 320 traveling, e.g., at pedestrian speeds, may collect multi-beam data with sufficient granularity versus position. High-rate beacons from APs 115 may contain conventional information along with elements or parameters expressing the current beam steering setting (shape and direction), and RF transmit power (collectively referred to as "transmission state"). Survey client 320 may periodically (e.g., every second) record 1) location, 2) AP ID information (e.g., SSID and/or MAC), 3) channel number, 4) RSSI level, and 5) the beam selection element(s) (shape, direction, power), i.e., transmission state.

Figure 4:
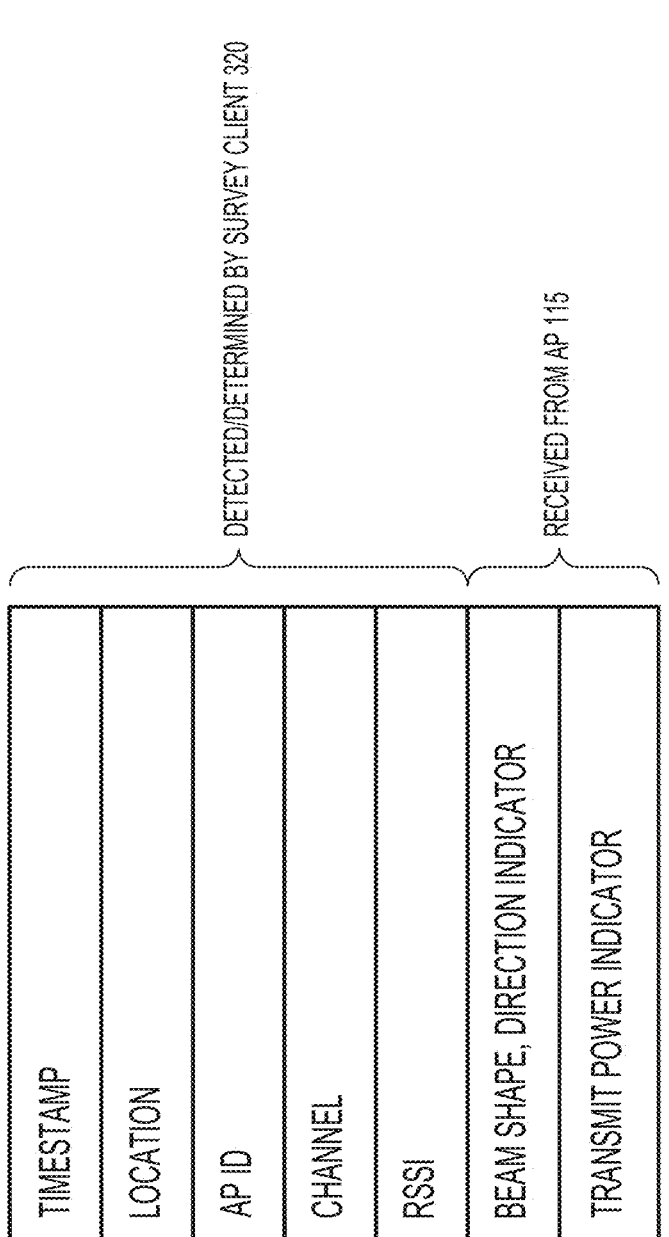
FIG. 4 shows elements of an entry of a log file that the survey client might record as the survey client traverses the path shown in FIG. 3, according to an example embodiment.

In this vein, FIG. 4 shows elements of an entry of a log file that survey client 320 might record as survey client 320 traverses path 310 shown in FIG. 3, according to an example embodiment. As indicated, many of the recorded parameters are generated by survey client 320 itself, while other parameters or telemetry is provided by a given AP 115.

Figure 5:
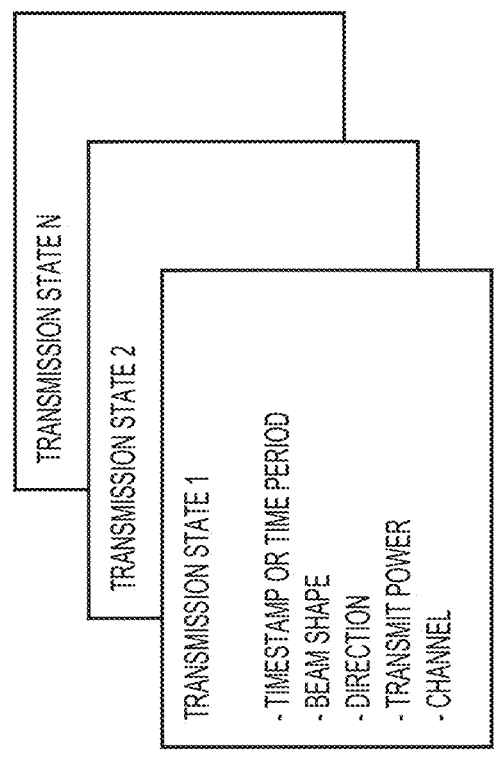
FIG. 5 shows possible transmission state information that antenna beam optimization logic might store as a given access point cycles through multiple transmission states, according to an example embodiment.

FIG. 5 shows a series of transmission states that antenna beam optimization logic 170 or WLAN controller 150 might store as a given AP 115 cycles through multiple transmission states, according to an example embodiment. That is, antenna beam optimization logic 170 or WLAN controller 150 might record for each transmission state 1, 2, . . . , N, a timestamp or time range, beam shape, beam direction, transmit power, and transmit channel. This timestamped data can be processed with timestamped telemetry received from survey client 320. Each transmission state could be one that is ultimately selected for a given AP at the conclusion of the survey period, i.e., for normal operations.

The survey process may be accelerated by adding additional simultaneous survey clients 320. For example, each survey client 320 may traverse a separate section of the venue.

After all data is collected by survey client(s) 320 and supplied/transmitted to antenna beam optimization logic 170 (local or cloud-based), a post-processing network configuration optimizer applies a predictive algorithm to the resulting large survey database and derives optimum antenna beam settings (shape, direction), channel, and RF transmit power for each AP 115. A non-limiting possible algorithmic sequence for the predictive algorithm may be:

1) determine distinct coverage zones for each AP 115 with minimum overlap with neighbors, wherein an optimization cost function may include a) minimum overlap with neighbor APs 115 and b) coverage area constrained by desired user count/capacity;

2) select a channel that optimizes channel reuse/minimizes co-channel interference; and 3) select an RF transmit power level that ensures a pre-determined minimum SNR within the coverage zones (taking into account any predicted co-channel interference).

Thus, a challenge addressed by the embodiments described herein is to select a transmission state not only for a given AP 115, but for all other APs 115 within WLAN 110 in adjacent coverage zones. APs 115 are ultimately controlled to have their beams work in harmony with each other to provide contiguous coverage and uniform signal strength in LPV 130 while minimizing overlap and co-channel interference. To collect the data for this optimization, each AP 115 cycles through its beam states (transmission states) while a site survey route or path 310 is traversed by survey client 320. Using automated GPS positioning and/or dead reckoning, the survey may be conducted outdoors or indoors.

As survey client 320 traverses the venue, it performs measurements on AP transmissions throughout all these transmission states. Notably, transmission state changes (e.g., every 1-5 seconds) are very rapid in comparison to the movement of survey client 320. Simultaneously, other APs 115 controlled by WLAN controller 150 are cycling through their respective transmission states and corresponding telemetry is recorded by survey client 320.

The collected data may be post-processed by the 3-step process described above, after which an optimum transmission state (e.g., channel, beam shape, direction, power level) is selected from among the plurality of cycled-through transmission states for each of the APs 115 in WLAN 110.

FIG. 6 shows a flowchart depicting a series of operations controlled by antenna beam optimization logic, according to an example embodiment. At 610, an operation includes, during a survey period, causing a first access point and a second access point in a wireless local area network, to simultaneously transmit survey transmissions according to a predetermined sequence of transmission states. At 612, an operation includes receiving, from a survey station that received the survey transmissions during the survey period, telemetry associated with the survey transmissions, the telemetry including a location of the survey station when the survey station received the survey transmissions. And, at 614, an operation includes after the survey period, controlling, based on the telemetry associated with the survey transmissions, the first access point to operate according to a first transmission state from among the transmission states and the second access point to operate according to a second transmission state from among the transmission states.

Figure 7:
FIG. 7 is a block diagram of a computing device, server, etc., that may be configured to host antenna beam optimization logic and perform the techniques described herein, according to an example embodiment.

FIG. 7 is a block diagram of a computing device, server, etc., that may be configured to host antenna beam optimization logic and perform the techniques described herein, according to an example embodiment.

In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720 (which could include, for example, antenna beam optimization logic 170). In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations, and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa) or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data, and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/ antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but are not limited to, providing overall control operations of a computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read-only memory (ROM), erasable programmable read-only memory (EPROM), application-specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that are capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer readable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software-defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used, such as electric, sound, light, infrared, and/or radio, to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc., which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein, and in the claims, can include any IP version 4 (IPv4) and/or IP version 6 (IPv6) addresses.

To the extent that embodiments presented herein relate to the storage of data, the embodiments may employ any number of any conventional or other databases, data stores, or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, in one embodiment a method is provided. The method may include, during a survey period, causing a first access point and a second access point in a wireless local area network to simultaneously transmit survey transmissions according to a predetermined sequence of transmission states, receiving, from a survey station that received the survey transmissions during the survey period, telemetry associated with the survey transmissions, the telemetry associated with the survey transmissions including a location of the survey station when the survey station received the survey transmissions, and after the survey period, controlling, based on the telemetry associated with the survey transmissions, the first access point to operate according to a first transmission state from among the predetermined sequence of transmission states and the second access point to operate according to a second transmission state from among the predetermined sequence of transmission states.

In the method, a parameter of the predetermined sequence of transmission states may include a beam shape.

In the method, a parameter of the predetermined sequence of transmission states may include a beam direction.

In the method, a parameter of the predetermined sequence of transmission states may include a beam transmission power.

In the method, a parameter of the predetermined sequence of transmission states may include a transmission channel.

In the method, the survey transmissions may include at least one of an access point identifier, an indication of transmission power, an indication of a beam shape, and an indication of a beam direction.

The method may be performed in one of a stadium or a concert hall.

In the method, a time period to cycle through the predetermined sequence of transmission states during the survey transmissions may be about 1-5 seconds.

The method may further include determining, based on the telemetry associated with the survey transmissions, an optimized transmission state for each of the first access point and the second access point.

In the method, the determining may include at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

A device may also be provided. The device may include an interface configured to enable network communications, a memory, and one or more processors coupled to the interface and the memory, and configured to: during a survey period, cause a first access point and a second access point in a wireless local area network, to simultaneously transmit survey transmissions according to a predetermined sequence of transmission states, receive, from a survey station that received the survey transmissions during the survey period, telemetry associated with the survey transmissions, the telemetry associated with the survey transmissions including a location of the survey station when the survey station received the survey transmissions, and after the survey period, control, based on the telemetry associated with the survey transmissions, the first access point to operate according to a first transmission state from among the predetermined sequence of transmission states and the second access point to operate according to a second transmission state from among the predetermined sequence of transmission states.

In an embodiment, a parameter of the predetermined sequence of transmission states may include a beam shape.

In an embodiment, a parameter of the predetermined sequence of transmission states may include a beam direction.

In an embodiment, a parameter of the predetermined sequence of transmission states may include a beam transmission power.

In an embodiment, the survey transmissions may include at least one of an access point identifier, an indication of transmission power, an indication of a beam shape, and an indication of a beam direction.

In an embodiment, a time period to cycle through the predetermined sequence of transmission states during the survey transmissions may be about 1-5 seconds.

In the device, the one or more processors may be further configured to determine, based on the telemetry, an optimized transmission state for each of the first access point and the second access point by at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

In still another embodiment, there is provided one or more non-transitory computer readable storage media encoded with instructions that, when executed by a processor, cause the processor to: during a survey period, cause a first access point and a second access point in a wireless local area network, to simultaneously transmit survey transmissions according to a predetermined sequence of transmission states, receive, from a survey station that received the survey transmissions during the survey period, telemetry associated with the survey transmissions, the telemetry associated with the survey transmissions including a location of the survey station when the survey station received the survey transmissions, and after the survey period, control, based on the telemetry associated with the survey transmissions, the first access point to operate according to a first transmission state from among the predetermined sequence of transmission states and the second access point to operate according to a second transmission state from among the predetermined sequence of transmission states.

In an embodiment, a time period to cycle through the predetermined sequence of transmission states during the survey transmissions may be about 1-5 seconds.

The instructions may be further configured to determine, based on the telemetry, an optimized transmission state for each of the first access point and the second access point by at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompasses all such changes, substitutions, variations, alterations, and/or modifications as falling within the scope of the appended claims.

What is claimed is:

1. A method includes:

during a survey period, causing a first access point and a second access point in a wireless local area network, to simultaneously transmit survey transmissions according to a predetermined sequence of transmission states, wherein the survey transmissions include at least one of an indication of a beam shape and an indication of a beam direction;

receiving, from a mobile survey station that received the survey transmissions during the survey period, telemetry associated with the survey transmissions, the telemetry associated with the survey transmissions including a location of the mobile survey station when the mobile survey station received the survey transmissions and a corresponding one of the at least one of the indication of a beam shape and the indication of the beam direction; and after the survey period, controlling, based on the telemetry associated with the survey transmissions, the first access point to operate according to a first transmission state from among the predetermined sequence of transmission states and the second access point to operate according to a second transmission state from among the predetermined sequence of transmission states.

2. The method of claim 1, wherein a parameter of the predetermined sequence of transmission states includes a beam shape.

3. The method of claim 1, wherein a parameter of the predetermined sequence of transmission states includes a beam direction.

4. The method of claim 1, wherein a parameter of the predetermined sequence of transmission states includes a beam transmission power.

5. The method of claim 1, wherein a parameter of the predetermined sequence of transmission states includes a transmission channel.

6. The method of claim 1, wherein the survey transmissions include at least one of an access point identifier and an indication of transmission power.

7. The method of claim 1, wherein the method is performed in one of a stadium or a concert hall.

8. The method of claim 1, wherein a time period to cycle through a given transmission state in the predetermined sequence of transmission states during the survey transmissions is 1-5 seconds.

9. The method of claim 1, further comprising determining, based on the telemetry associated with the survey transmissions, an optimized transmission state for each of the first access point and the second access point.

10. The method of claim 9, wherein the determining comprises at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

11. A device comprising:

an interface configured to enable network communications;

a memory; and one or more processors coupled to the interface and the memory, and configured to:

during a survey period, cause a first access point and a second access point in a wireless local area network, to simultaneously transmit survey transmissions according to a predetermined sequence of transmission states, wherein the survey transmissions include at least one of an indication of a beam shape and an indication of a beam direction;

receive, from a mobile survey station that received the survey transmissions during the survey period, telemetry associated with the survey transmissions, the telemetry associated with the survey transmissions including a location of the mobile survey station when the mobile survey station received the survey transmissions and a corresponding one of the at least one of the indication of a beam shape and the indication of the beam direction; and after the survey period, control, based on the telemetry associated with the survey transmissions, the first access point to operate according to a first transmission state from among the predetermined sequence of transmission states and the second access point to operate according to a second transmission state from among the predetermined sequence of transmission states.

12. The device of claim 11, wherein a parameter of the predetermined sequence of transmission states includes a beam shape.

13. The device of claim 11, wherein a parameter of the predetermined sequence of transmission states includes a beam direction.

14. The device of claim 11, wherein a parameter of the predetermined sequence of transmission states includes a beam transmission power.

15. The device of claim 11, wherein the survey transmissions include at least one of an access point identifier, an indication of transmission power, an indication of a beam shape, and an indication of a beam direction.

16. The device of claim 11, wherein a time period to cycle through a given transmission state in the predetermined sequence of transmission states during the survey transmissions is 1-5 seconds.

17. The device of claim 11, wherein the one or more processors are further configured to determine, based on the telemetry, an optimized transmission state for each of the first access point and the second access point by at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

18. One or more non-transitory computer readable storage media encoded with instructions that, when executed by a processor, cause the processor to:

during a survey period, cause a first access point and a second access point in a wireless local area network, to simultaneously transmit survey transmissions according to a predetermined sequence of transmission states, wherein the survey transmissions include at least one of an indication of a beam shape and an indication of a beam direction;

receive, from a mobile survey station that received the survey transmissions during the survey period, telemetry associated with the survey transmissions, the telemetry associated with the survey transmissions including a location of the mobile survey station when the mobile survey station received the survey transmissions and a corresponding one of the at least one of the indication of a beam shape and the indication of the beam direction; and after the survey period, control, based on the telemetry associated with the survey transmissions, the first access point to operate according to a first transmission state from among the predetermined sequence of transmission states and the second access point to operate according to a second transmission state from among the predetermined sequence of transmission states.

19. The one or more non-transitory computer readable storage media of claim 18, wherein a time period to cycle through a given transmission state in the predetermined sequence of transmission states during the survey transmissions is 1-5 seconds.

20. The one or more non-transitory computer readable storage media of claim 18, wherein the instructions are further configured to determine, based on the telemetry, an optimized transmission state for each of the first access point and the second access point by at least one of:

(a) determining distinct coverage zones for each of the first access point and the second access point with minimum overlap with other access points;

(b) selecting respective channels for each of the first access point and the second access point that optimizes channel reuse;

(c) selecting respective channels for each of the first access point and the second access point that minimizes co-channel interference; and (d) selecting transmit power levels for each of the first access point and the second access point that ensures a predetermined minimum SNR within selected coverage zones.

\* \* \* \* \*